W. Bradbury.
Elevator.

Sheet 1-3 Sheets.

N°. 91,819.  Patented Jun. 29, 1869.

Witnesses:
N. C. Lombard
Frank Alley

Inventor:
William Bradbury

W. Bradbury.
Elevator.

N°. 91,819. Patented Jun. 29, 1869.

Witnesses:
N. P. Lombard
Frank Allen

Inventor.
William Bradbury

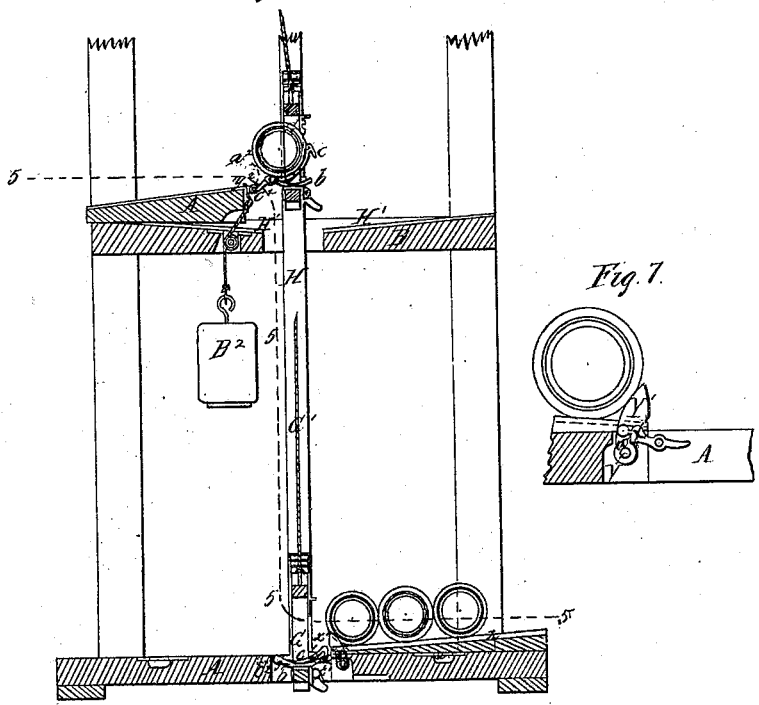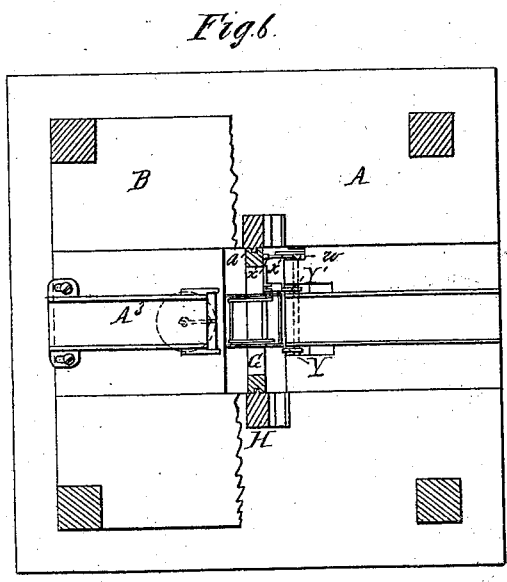

United States Patent Office.

WILLIAM BRADBURY, OF NEWTON, MASSACHUSETTS.

Letters Patent No. 91,819, dated June 29, 1869.

MACHINERY FOR RAISING AND LOWERING GOODS.

The Schedule referred to in these Letters Patent and making part of the same.

*To all whom it may concern:*

Be it known that I, WILLIAM BRADBURY, of Newton, in the county of Middlesex, and State of Massachusetts, have invented certain new and useful Improvements in Machinery for Raising and Lowering Goods of various kinds from one loft to another; and I do hereby declare the following to be a full, clear, and exact description of the same, reference being had to the drawings accompanying this specification, and forming a part of the same, and to the letters of reference marked thereon.

In the drawings—

Figure 5 is a vertical section through two floors, on the same line as fig. 2, but looking in an opposite direction, and showing my improved apparatus as adapted to hoisting.

Figure 6 is a sectional plan, the cutting-plane being on line 5 5, on fig. 5, and showing a part of the first and second floors, with the apparatus as adapted for hoisting.

Figure 7 is a partial section through lower floor, showing the self-loading apparatus to be used when hoisting.

Figure 2:
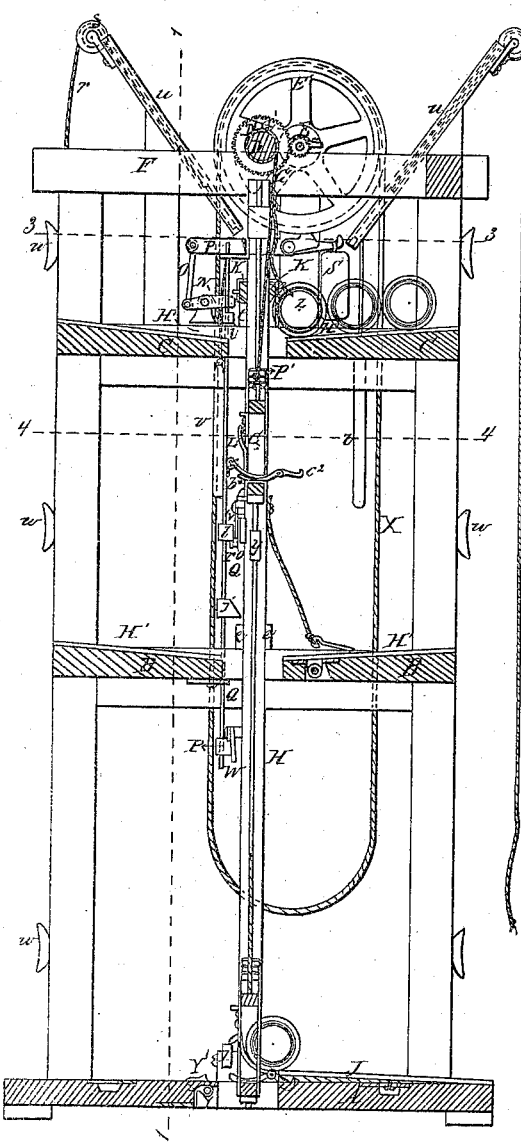
Figure 2 is also a vertical section, taken transversely to the plane of fig. 1, on line 2 2, on fig. 1.
Figure 1:
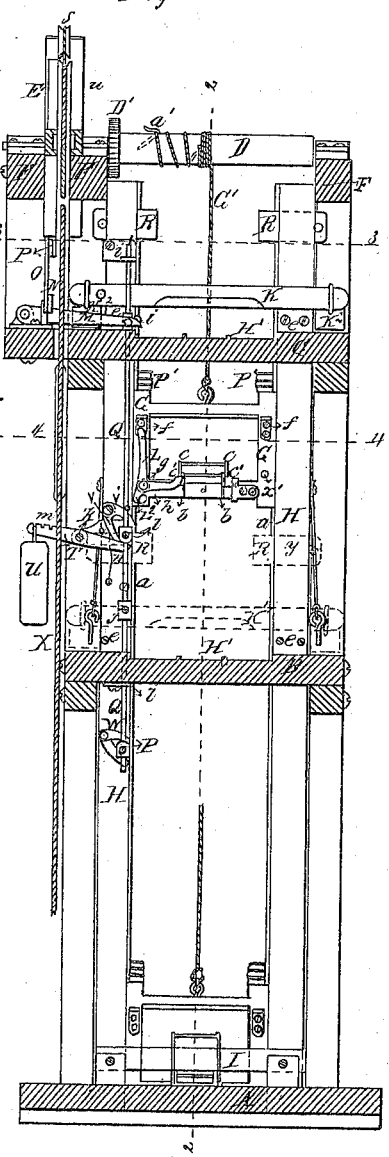
Figure 1 represents a vertical section, on line 1 1, on fig. 2, through three floors of a building, and showing my improved apparatus in elevation as applied thereto.
Figure 3:
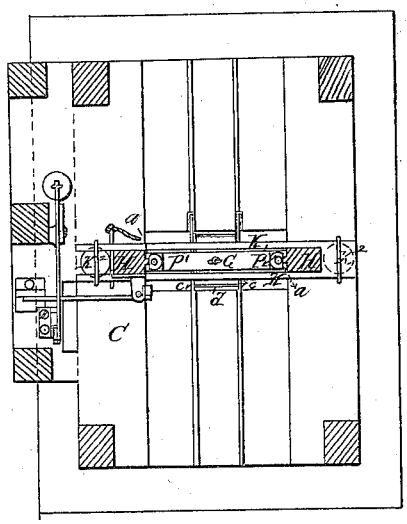
Figure 3 is a sectional plan, the cutting-plane being on line 3 3, on figs. 1 and 2.
Figure 4:
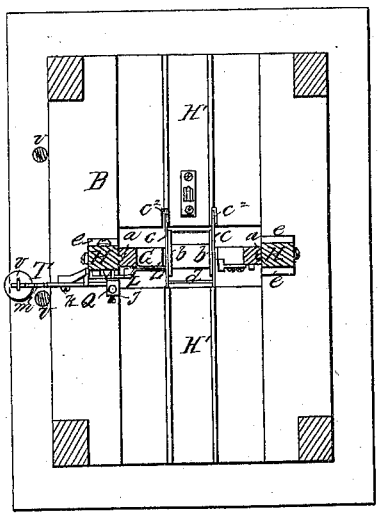
Figure 4 is a sectional plan, the cutting-plane being on line 4 4, on figs. 1 and 2.

My invention relates to an improved machine for lowering goods from one loft to another where there is no power for operating a machine other than animal or manual; and It consists, first, of a peculiar construction and arrangement of lowering-mechanism, in combination with receiving and delivering inclined ways, or their equivalents, and other subordinate devices, by means of which the weight to be lowered is made to operate the machine automatically, and receive the several loads in succession at the top of the descent, and discharge them at the bottom without manual intervention.

It consists, secondly, in the combination with the hoisting and lowering-mechanism and the inclined ways for supplying the load to the carriage thereof, of a stop-bar, or other suitable detent, so arranged as to be operated automatically in connection with the carriage, so as to admit the proper load to the carriage, and to check and retain a further supply, and prevent the goods from coming forward until the empty carriage has returned for another load.

It also consists, in the third place, in the application to the carriage of a hinged cradle for the reception of the goods, so constructed and applied that when the load rolls on to it the lowering-mechanism is thereby released, and the load descends until the cradle is tilted and the load is discharged.

It consists, in the fourth place, in a peculiar arrangement of mechanism, which will be hereafter more fully described, by means of which a brake, or other suitable detent, is automatically applied to the lowering-mechanism at the proper time to check its momentum, and stop its motion just as the empty carriage has lifted the stop-bars, so as to allow the barrel or bale resting against it to roll on to the cradle; and it also consists in the use of a pair of powerful springs on the top of the carriage-frame, which aid the brake in bringing the carriage to a stand-still at the proper time, and also assist in setting the mechanism in motion again when the carriage has received another load.

It also consists, in the fifth place, in the use of a system of mechanism, to be operated by the carriage, so arranged as to retard the carriage during any determined part of its descent, for the purpose of adapting the mechanism to lower and discharge the goods in loads of different weights, and at different heights, without endangering it by an excessive increase of velocity or momentum, as would be the case in lowering from the fourth or fifth loft of a building to the lower floor without retarding or checking the descent of the load.

It consists, in the sixth place, in attaching the rope by which the carriage is suspended from the drum, in such a manner that it may be adjusted to the proper length from the point of attachment on the drum, so as to allow the carriage to descend to the position to permit the load to be discharged, and then, by the continued motion of the drum, to raise the carriage again to take another load.

And it also consists, in the seventh place, in certain modifications of parts of the mechanism, by which the machine may be adapted to hoisting goods, which will be hereafter more fully described.

Having thus stated the nature of my invention, I will now proceed to explain its construction and operation.

The same letters refer to the same parts in all the drawings.

A, B, and C represent, respectively, the first, second, and third floors of a store-house having my improved apparatus applied thereto, said floors being built so as to form an inclined plane, H', on either side of the scuttle, and provided with a pair of rails, to facilitate the loading of the barrels.

D is the drum, or windlass, on which the rope is wound by which the carriage is suspended.

On one end of said drum is a spur-gear, D', which is driven by the pinion E, on the shaft of the grooved wheel E', made with a heavy rim, so as to serve as a fly-wheel, for the purpose of accumulating power during the descent of the load, to bring the carriage up again to the starting-point.

The drum D and fly-wheel E' are mounted in suitable bearings on the frame-work F, and are usually placed in the upper loft of the building, above all goods requiring to be raised or lowered thereby.

G is a frame, made of wood, which I call the carriage, the vertical timbers of which are grooved, and fitted to the tongues $a$ $a$, inserted in the posts H H, on which it moves up or down in a vertical line from the bottom to the top, or from the top to the bottom of the building, as the rope G', by which it is suspended from the drum, is wound on to or unwound from said drum.

The rope G', by which the carriage is suspended, is attached at one end to the carriage by means of an eye-bolt, and the other end is made fast to the drum by being passed through a hole in the drum and wound several times around the drum, and the end made fast to the spring-clamp $a^1$, the rope being of such a length as that, when the carriage has descended far enough to dump its load on the lower floor, the rope shall be very nearly all unwound from the drum, so that as the momentum obtained by the fly-wheel during the descent of the load continues to revolve it in the same direction, the rope is wound up on the drum again, but on the opposite side from which it has just been unwound, and the carriage is raised to the starting-point again, ready to receive another load.

To the lower bar of the carriage is attached a cradle, to receive the goods to be lowered, which, in the case represented in the drawings, are barrels of flour, or any other goods put up in barrels.

The cradle, in the case represented, consists of two bars of wrought-iron, $b$ $b$, bent in the form of a segment of a circle, the diameter of said circle being about the same as the diameter of a flour-barrel, and attached firmly to the lower bar of the carriage.

One end of said bars $b$ $b$ is connected together by means of a small rod of iron, on which are pivoted two other bars of wrought-iron, $c$ $c$, and curved like the fixed bars, but having an extension, $c^1$ $c^1$, downward from the free end of each, somewhat in the form of legs, and connected together by a rod, or bolt, $d$.

The bars $c$ $c$ also have two hook-shaped arms, $c^2$ $c^2$, on the ends opposite to the projection $c^1$ $c^1$, which are used for hoisting.

I is a dumping-bar, attached to the posts H H, in such a position, near the lower floor, that when the carriage descends with its load the legs $c^1$ $c^1$ strike upon it, and as the carriage continues to descend, the bars $c$ $c$ of the cradle are tilted until the barrel rolls off on the inclined railway-track J, down which it rolls to the door of the building, where it is to be loaded to be carted away; or the inclined plane may be so arranged as to deliver the goods in any other direction desired.

K and $K^1$ are stop-bars, attached to the posts H H, in such a manner that they may be readily removed, and are susceptible of being moved up by the action of the lugs or brackets $f$ $f$, bolted to the side of the carriage, and which, coming in contact with the bars K and $K^1$, lift them enough to allow the barrel to roll under them and fall on to the cradle.

Said bars have weights, $K^2$, attached to each end, sufficiently heavy to insure the falling of the bars as fast as the carriage descends, until they rest on the fixed stops $e$ $e$, when they are in a position to check the next barrel, and prevent it from falling through the scuttle.

A pair of said bars, with the necessary weights, are fitted to the posts H H just above the scuttle, but only that one is used which is just above the floor from which the goods are being delivered.

L is a lever, having three arms, as represented in the drawings, and attached to the carriage-frame by the fulcrum-pin $g$, and is held in the position shown in the drawings by the spring $h$.

When there is no load on the cradle, the arm $L^1$ being under the bar $c$ of the cradle, the pivoted portion of the cradle is forced, by the action of the spring $h$, to assume the position shown in the drawings, and the vertical arm of said lever, extending upward from the fulcrum, will be in such a position that, as the carriage moves up and approaches the stop-bar K, its upper end will strike the projection $i$, on the lever M, and lift it, and through the lever N and link O, acting upon the long arm of the brake-lever P, apply the brake to the fly-wheel with sufficient force, acting in conjunction with the powerful springs P', on the top of the carriage-frame, to arrest the motion of the wheel and bring the carriage to a stand-still just when it has lifted the stop-bar K far enough to allow the barrel resting against it to roll on to the cradle.

Q is a lifting-rod, suspended from the lever M, and guided by suitable bearings, $i'$ $i'$, bolted to the post H.

$j$ is a lug, made fast to the rod Q by means of a set-screw, and is used for the upper end of the lever L to strike against when goods are being delivered from the floor B, and, by lifting the rod Q, operate the brake-lever so as to stop the wheel and the motion of the carriage at the proper time.

The lug $j$ is turned on the rod Q by loosening the set-screw, so that the lever L cannot strike it when goods are being delivered from the upper floor.

The lug $j$ would be duplicated on every floor except the upper, where the lever M serves the same purpose, the rod Q being long enough to admit of this.

The springs P' P', on the top of the carriage, strike against the stops R, just before the upward movement of the carriage ceases, and serve the double purpose of checking the momentum of the fly-wheel and setting it in motion again.

The brake is removed from contact with the wheel by the weight of the barrel falling on to the bars $c$ $c$ of the cradle, (which were raised above the bars $b$ $b$ by the action of the spring $h$ on the lever L,) and depressing them; and through them the horizontal arm $L'$ of the lever L is depressed, and the vertical arm of the said lever is withdrawn from under the lever M, and the weight of the rod Q and the weight S, suspended from the short arm of the brake-lever P, acts to remove the brake from the wheel.

T is a lever, attached to the post H by means of a fulcrum-pin, $k$, and may be placed at any point between the starting-point of the carriage and the floor B, according as circumstances may require.

The inner arm of said lever, toward the carriage, is arranged to act upon the lifting-rod Q by means of the lug $l$.

The outer end is provided with several notches $m$, to fix the location of the weight U, according as greater or less weight is required.

A lever having two arms, V and V', is pivoted to the post H, just above the inner end of the lever T, and is held in the position shown in the drawing by the spring $n$, the arm V resting on the top of the side projection $o$ on the lever T, and latching it so that the weight U does not cause the lever T to act upon the rod Q, to apply the brake to the wheel, and at the same time it presents no obstacle to the free movement of the rod Q, for the purpose of applying the brake when the carriage arrives at or near the end of its upward movement.

The arm V' projects slightly beyond the line of the inner edge of the post H, and in the same vertical plane with the arm $L^2$ of the lever L, so that when the carriage descends with a load upon it, the end of the arm $L^2$ will strike the arm V', and overcoming the tension of the spring $n$, will trip the arm V from the lever T, and allow the weight U to act upon the rod Q, and thus apply the brake to the wheel with greater or less force, according to the size of the weight or the notch in which it is placed on the lever T.

W is another lever, pivoted to the post H, and having two arms, one of which rests upon the top side of the lug $p$, on the rod Q, while the other arm projects beyond the inner line of the post H, in such a position that, as the carriage descends, the arm $L^2$ of the lever L will strike it, and pull the rod Q downwards with sufficient force to lift the weight U, and allow the lever T to be again latched by the lever V, in which condition it remains until tripped again by the next descent of the carriage. The load being removed from the carriage, the spring $h$ instantly acts to throw the lever L into such a position that the arm $L^2$ will pass the lever V' without touching it in moving up.

The weight U is only to be placed upon the lever T in case the distance is so great or the load so heavy that too much momentum would be obtained, and is used solely to retard or check the motion of the carriage in its downward movement, the object being to prevent too great a velocity being obtained by the descending load, it being necessary to obtain only so much momentum, or accumulate only so much power in the fly-wheel, by the descent of the load, as is necessary to raise the empty carriage again to the starting-point, and lift the stop-bars, to allow the carriage to be again loaded.

X is a hand-fall or endless-rope belt, passing over the fly-wheel in a groove provided for the purpose, and used to operate the windlass to bring the carriage to the proper point to receive its load preparatory to commencing to deliver goods, when it is lifted from the wheel by means of the cords $r\ r$ passing over the pulleys $s\ s$, said cords being attached to rings $t\ t$, through which the fall X passes, said rings moving upward and outward from the wheel, in grooves provided for the purpose in the inclined guides $u\ u$, the rope or fall X being guided in its descent on to the wheel by the said rings.

$v\ v$ are weights attached to the rings $t\ t$, for the purpose of insuring the fall of the rings when the cords $r\ r$ are released from the belaying-cleats $w\ w$.

$y\ y$ are mortises in the posts H, in which stops R R are to be inserted, as shown in red lines, to prepare the machine to deliver goods from the floor B.

Y is a rocker-shaft, supported in suitable bearings in or under the lower floor, and to which the stop-levers or arms Y' are attached, and project above the floor a sufficient distance to chock a barrel, and prevent it from rolling into the scuttle before the cradle is in a position to receive it.

$w'$ is a dog, attached firmly to the rocker-shaft Y, and $x$ is a weighted pawl, so constructed and applied that the weighted end shall act upon the dog $w'$, and prevent the rocker-shaft Y and the levers or arms Y' from revolving toward the scuttle until the carriage descends, when the pin $x'$, striking the inner end of the pawl $x$, lifts the weighted end, and allows the weight of the barrel to revolve the rocker-shaft and roll on to the carriage, rolling over the levers Y', the inner ends of which rest on the lower bar of the carriage.

$y$ is a lug attached to the lower bar of the carriage, in such a position that, when the carriage moves up with its load, said lug comes in contact with one of the levers Y', and lifts it up to its original position, when the weighted pawl drops in gear with the dog $w'$, and prevents the next barrel from rolling into the scuttle.

The rocker-shaft Y, levers Y', dog $w'$, weighted pawl $x$, the pin $x'$, lug $y$, and inclined plane Z comprise the self-loading apparatus for hoisting-purposes. The lug $y$ is provided with a stop-joint, so constructed that when not needed for hoisting, it may be folded back on the lower bar of the carriage, so that it shall not come in contact with the dumping-bar I when the carriage is being used for lowering, at the same time the levers Y' are turned back in the position shown in fig. 2.

$A^3$ is a movable incline, to be placed upon the floor where it is desirable to discharge the load when hoisting.

The end farthest from the scuttle is attached to the floor in such a manner that, while it cannot be lifted from the floor, it is free to move toward the scuttle.

The end toward the scuttle is held down to the floor by the weight $B^2$ in a perfectly obvious manner.

The front end is also provided with two metal arms $y^2$, one on each side, projecting toward the scuttle, and their ends connected by the rod $a^2$, on to which the projecting arms $c^2\ c^2$ on the cradle hook, as the carriage moves up, and lifting it a short distance from the floor, and drawing it toward the scuttle, dumps the load from the cradle; at the same time, by virtue of its elasticity, it serves to arrest the upward motion of the carriage more gradually, and prevent an undue strain from being exerted upon the rope and carriage, as might be the case were the stop for dumping rigidly attached to the floor.

The operation of my machine, when used for lowering goods, is as follows:

The apparatus being in the condition represented in the drawings, except that the weight U is removed from the lever T, and it being desirable to deliver a certain quantity of flour or other barrelled goods from the floor C to the floor A, a man is sent into the loft to break out the flour and start the machine. He first rolls three or four barrels on to the inclined railway leading to the scuttle, the first barrel resting against the stop-bar K, when he steps to the fall that passes over the fly-wheel, and turns the wheel by it until the carriage has lifted the stop-bar so as to allow the first barrel to fall on to the cradle, the weight of which, depressing the pivoted bars $c\ c$ of the cradle, (which were held in an elevated position before the load was received, by the force of the spring $h$ acting on the lever L,) and tipping the lever L from its contact with the projection $i$ on the lever M, releases the brake from contact with the fly-wheel, when the weight of the load, assisted by the reaction of the powerful spring P', on the top of the carriage, causes the drum D to begin slowly to revolve and the rope to unwind from its periphery, while the spur-gear D' on the drum D, acting on the pinion E, causes the fly-wheel to revolve three, four, or more times faster than the drum.

The moment that the carriage has arrived at the limit of its upward movement, the operator pulls upon the cords $r\ r$ until the fall is lifted entirely free from the wheel, and makes them fast to the belaying-cleats $w\ w$, after which the machine is entirely self-acting as long as the requisite load is furnished to it at each descent.

When the carriage begins to descend, the stop-bar K descends with it until it rests on the stops $e\ e$, when it is in a position to stop the next barrel from rolling into the scuttle, and holds it in that position, represented by the blue circles marked $z$ in the drawing, until the carriage again lifts the stop-bar K.

The carriage continues to descend, constantly increasing in speed until the legs $c'\ c'$, on the pivoted cradle, strike on the dumping-bar I, when the continued descent of the carriage causes the pivoted cradle to be tilted into the position shown in red lines in fig. 2, and the barrel rolls off on to the inclined ways A', down which it rolls to the door of the building.

Just at the same time that the barrel is rolled off from the cradle, the rope by which the carriage is connected with the drum D, is all unwound from the drum D, and as the fly-wheel continues to revolve, on account of the momentum obtained during the descent of the carriage, the rope is wound up again on the opposite side of the drum, and the carriage drawn up with sufficient force to lift the stop-bar K, with the barrel resting against it, and the lever L, coming in cotact with the lever M, lifts it, and applies the brake to the fly-wheel to check its motion, at the same time the spring P' comes in contact with the stops R, and are compressed.

When the bar K has been lifted the requisite distance, and just as the springs P' and the brake have overcome the momentum of the wheel and brought it to a stand-still, the barrel rolls on to the cradle, and tripping the lever L, releases the brake from contact with the wheel, and again sets the machine in motion, which operation will be repeated as long as the proper load is supplied to it.

If it is desired to deliver goods from the floor B, the bar K' is to be placed in its proper position, as shown in red dotted lines, with the weights attached, and the stops R are inserted in the mortises $y\ y$, the carriage having been first let down below the floor B, when the process of operation is precisely the same as in delivering from the floor C, except that in the ascent of the carriage, the lever L applies the brake to the wheel by striking the lug $j$ on the lifting-rod Q, which is attached to the lever M.

In case the distance is so great, or the load so heavy as to increase the speed beyond what is desirable, the weight U is placed upon the lever T, which is latched, so that the weight is held up until the carriage descends, when the arm $L^2$ of the lever L comes in contact with the arm V', and overcoming the tension of the spring $n$, trips the arm V from the lever T, and allows the weight to lift the rod Q, and apply the brake to the fly-wheel with greater or less force, according to the size of the weight, or the notch in the lever in which it is placed, and thereby retard or partially check the descent of the carriage and its load.

The time of applying this check will vary according to circumstances, and may be regulated by changing the location of the lever T.

As the carriage continues to descend, the arm $L^2$ of the lever L comes in contact with the lever W, and carrying it down by its action on the lug $p$, draws the rod Q, with the inner end of the lever T, down, until it is latched again, and the brake is removed from the wheel, and the weight U is prevented from acting upon the brake again until the next descent of the carriage.

The duration of the retard-check must also be varied by circumstances, and may be regulated by placing the lever W and lug $p$, nearer to or farther from the lever T.

By the use of this invention for lowering goods, which is entirely automatic, it being self-loading, self-operating, and self-unloading, I am enabled to deliver two or three times as many goods in the same time as by the old process, deliver them in better condition, and it requires but one man; where the old process required three or four.

Another advantage it has over the old arrangement, is the greater degree of safety attending its use, the scuttles being comparatively small, and the stop-bar K making it next to impossible for a person to fall through them.

To adapt my machine for hoisting, it is only necessary to remove the dumping-bar I, place the levers Y' in the position shown in figs. 5 and 7, place the inclined plane $z$ in the position shown in fig. 5, and make it fast to the floor so that it cannot move, and attach the inclined rail-track $A^3$ to the floor on which it is desirable to deliver the flour, in the manner shown in fig. 5, with the weight $B^2$ attached to the end next to the scuttle, as shown, and throw the hinged lug $y$, attached to the carriage, out and down till the shoulder of the joint prevents its being moved further, when the machine is ready for hoisting, the windlass and hand-fall being used for that purpose.

The barrels being rolled on to the incline till they rest against the levers Y', as shown in blue lines in figs. 5 and 7, the carriage is allowed to descend until the pin $x'$ strikes the inner end of the pawl $x$, and depressing it, lifts the weighted end, and disengages it from the dog $w'$, when the weight of the barrels pressing against the levers Y', causes the rocker-shaft Y to rotate, and the barrel rolls on to the cradle.

As the carriage ascends, whether operated by the windlass, or by horse or steam-power, the hinged lug $y$ coming in contact with one of the levers Y', lifts it up until the pawl $x$ exgages with the dog $w'$, and checks the next barrel, and holds it in the position shown in fig. 7 until the carriage descends again.

As the carriage approaches the point where it is to be discharged, the hook-shaped arms on the cradle engage with the rod $a^2$ on the inner end of the incline $A^3$, and by the resistance presented by the weight $B^2$, the cradle is dumped, as shown in red lines in fig. 5, and the barrell rolled off on to the inclined track, down which it rolls, while the carriage descends again to receive another load.

The carriage may be operated by the windlass and hand-fall, or the carriage may be disconnected from the windlass and attached to a rope leading over a pulley in the upper loft, thence under another on the lower floor, and thence to a steam-engine; or it may be attached to a horse in the usual manner.

Having thus described the nature and operation of my invention,

What I claim as my invention, and wish to secure by Letters Patent, is—

1. The machine for lowering goods, constructed and operating substantially as described.

2. In an apparatus for lowering goods operated by the descending load, raising the empty carriage again, after its load has been discharged, by accumulated power generated by the descent of the load, by means of a fly-wheel, or an equivalent device connected therewith, substantially as described.

3. The combination of the carriage with the inclined ways H', which supply the load to the same, substantially as described.

4. In combination with the carriage and inclined ways H', which supply the goods to the carriage, the stop-bars or detents K and K', for releasing the load to the carriage, and arresting the supply, substantially as described.

5. The method of releasing the brake from the fly-wheel, which permits the load to descend, by operating the releasing-mechanism by the weight of the load, substantially as described.

6. The method of applying the brake to the fly-wheel by the ascent of the empty carriage, so as to bring the carriage to a stand-still at the proper place to receive another load, substantially as described 7. The within-described device for applying the brake to the fly-wheel during a portion of the descent of the load, to retard its motion, and to release it again at the proper time, substantially as described.

8. The combination of the hoisting-carriage, the loading-ways $A^3$, and the devices shown, or their equivalents, for releasing and retaining the goods to be loaded, all constituting a self-loading apparatus to be used in hoisting goods, substantially as described.

9. The combination of the hoisting-carriage and the yielding-stop, and inclined ways, for discharging the load from the carriage in hoisting, substantially as described.

Executed at Boston, this 6th day of February, 1869.

WILLIAM BRADBURY.

Witnesses:
N. C. LOMBARD,
FRANK ALLEN.